United States Patent
Chou

(10) Patent No.: US 7,485,818 B2
(45) Date of Patent: Feb. 3, 2009

(54) TILT SWITCH

(76) Inventor: Tien-Ming Chou, No. 41, San-Hsi 5th St., Pei Dist., Taichung City (TW)

( * ) Notice: Subject to any disclaimer, the term of this patent is extended or adjusted under 35 U.S.C. 154(b) by 382 days.

(21) Appl. No.: 11/490,190

(22) Filed: Jul. 21, 2006

(65) Prior Publication Data

US 2008/0017487 A1   Jan. 24, 2008

(51) Int. Cl.
*H01H 35/02* (2006.01)
*H01H 35/14* (2006.01)
(52) U.S. Cl. .............. 200/61.52; 200/61.45 R; 250/221; 250/222.1; 340/687
(58) Field of Classification Search ............. 200/61.52, 200/61.45 R; 250/221, 227.22, 239, 222.1, 250/231.1; 340/687
See application file for complete search history.

(56) References Cited

U.S. PATENT DOCUMENTS 3,831,163 A * 8/1974 Byers .................... 340/539.31
5,136,127 A * 8/1992 Blair ....................... 200/61.52
5,610,590 A * 3/1997 Johnson et al. .......... 340/573.4
6,392,223 B1 * 5/2002 Hjertman et al. .......... 250/231.1
2003/0057361 A1 * 3/2003 Chou ......................... 250/221

* cited by examiner

*Primary Examiner*—Kyung Lee
(74) *Attorney, Agent, or Firm*—Stephen A Bent; Foley & Lardner LLP

(57) ABSTRACT

A tilt switch includes a base and a cover body. The base includes an upright support having a lower groove, and first and second lower passage holes communicated with the lower groove. An emitter is mounted on the base to emit a light signal. A receiver is disposed opposite to the emitter to receive the light signal. The cover body includes first and second press pieces respectively having first and second upper passage holes that complement with the respective first and second lower passage holes to define first and second light passages, respectively, and an upper groove cooperating with the lower groove to define a chamber. The light signal propagates along a light path passing through the chamber from the first to the second light passage. A ball member is rollable within the chamber to block or unblock the light path.

8 Claims, 18 Drawing Sheets

TILT SWITCH

BACKGROUND OF THE INVENTION

1. Field of the Invention

The invention relates to a switch, more particularly to a tilt switch that accurately undergoes on/off operations.

2. Description of the Related Art

Referring to FIGS. 1 and 2, a conventional tilt switch 1 includes an insulated casing 10, a ball member 16, infrared light emitter and receiver 17, 18, and an insulated top cover 19.

The insulated casing 10 has two spaced-apart receiving spaces 11 extending from a stepped-shaped top face 101 to a bottom face 102, two pairs of through holes 12 formed in the bottom face 102 and each pair communicating with the corresponding receiving space 11, a groove 13 extending downwardly from the top face 101 and defined by an upper peripheral wall 131 and a tapered lower peripheral wall 132, and two notches 14 each formed between the groove 13 and the corresponding receiving space 11. Each notch 14 converges from the corresponding receiving space 11 toward the groove 13, and communicates with the groove 13 through a vertically extending slot 141 formed between the groove 13 and the corresponding notch 14.

The ball member 16 is disposed in the groove 13, and may be made of a copper or iron alloy, or may be gold plated.

The infrared light emitter 17 has a main body 171, two contact terminals 172 extending downwardly from the main body 171, and an emitter head 173 projecting on one side of the main body 171. The emitter 17 is inserted into one of the receiving spaces 11 with the emitter head 173 extending into the corresponding notch 14 and the contact terminals 172 extending out of the bottom face 102 of the casing 10 via the corresponding through holes 12.

The receiver 18 is used to receive a light signal emitted by the emitter 17, and has a main body 181, two contact terminals 182 extending downwardly from the main body 181, and a receiver head 183 located on one side of the main body 181. The receiver 18 is inserted into the other one of the receiving spaces 11 with the receiver head 183 extending into the corresponding notch 14 and facing the emitter head 173. The receiver head 183 and the emitter head 173 cooperatively form a light path (R). The contact terminals 182 extend out of the bottom face 102 of the casing 10 via the corresponding through holes 12.

The insulated top cover 19 is mounted on the top face 101 of the casing 10, and is connected to the casing 10 through a high frequency sealing technique.

When the tilt switch 1 is mounted upright on a circuit board (P) and is disposed in an untilted state, the ball member 16 falls into the lower peripheral wall 132 by virtue of gravity, and blocks the light path (R) so that the tilt switch 1 is in an "OFF" state. When an external force is applied to the tilt switch 1 so as to incline the tilt switch 1, the ball member 16 rolls away from the lower peripheral wall 132 and out of the light path (R), thereby shifting the tilt switch 1 to an "ON" state.

Although the conventional tilt switch 1 can achieve its intended purpose, because the slots 141 formed between the groove 13 and the corresponding notches 14 are elongated, light scattering from the emitter 17 and incident on an inner wall face of the top cover 19 may be reflected by the inner wall face of the top cover 19 toward the receiver 18. Therefore, it is possible for the receiver 18 to receive improper light signals from the emitter 17, even if the ball member 16 is in its blocking state.

SUMMARY OF THE INVENTION

Therefore, the object of the present invention is to provide a tilt switch that is capable of overcoming the aforementioned drawbacks of the prior art.

According to this invention, a tilt switch comprises a base, an emitter, a receiver, a cover body, and a ball member. The base includes an upright support that has a top face, two opposite first and second side faces extending downwardly from two opposite ends of the top face, a lower groove formed in the top face between the first and second side faces, and two opposite first and second lower passage holes formed in the top face proximate to the first and second side faces, respectively, and communicated with the lower groove. The emitter includes an emitter main body mounted on the base proximate to the first side face, and an emitter head aligned with the first lower passage hole to emit a light signal. The receiver is provided to receive the light signal, and includes a receiver main body mounted on the base proximate to the second side face, and a receiver head aligned with the second lower passage hole. The cover body includes a top wall, two spaced-apart first and second press pieces projecting downwardly from the top wall to press against the top face of the upright support proximate to the first and second side faces, respectively, and an upper groove formed between the first and second press pieces and cooperating with the lower groove to define a chamber. The first press piece has a first upper passage hole aligned and complementing with the first lower passage hole to define a first light passage for passage of the light signal. The second press piece has a second upper passage hole aligned and complementing with the second lower passage hole to define a second light passage for passage of the light signal. The light signal propagates along a light path passing through the chamber from the first light passage to the second light passage. The ball member is rollable within the chamber to block or unblock the light path. Each of the first and second light passages has a width in a top-to-bottom direction. The width is smaller than a diameter of the ball member.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
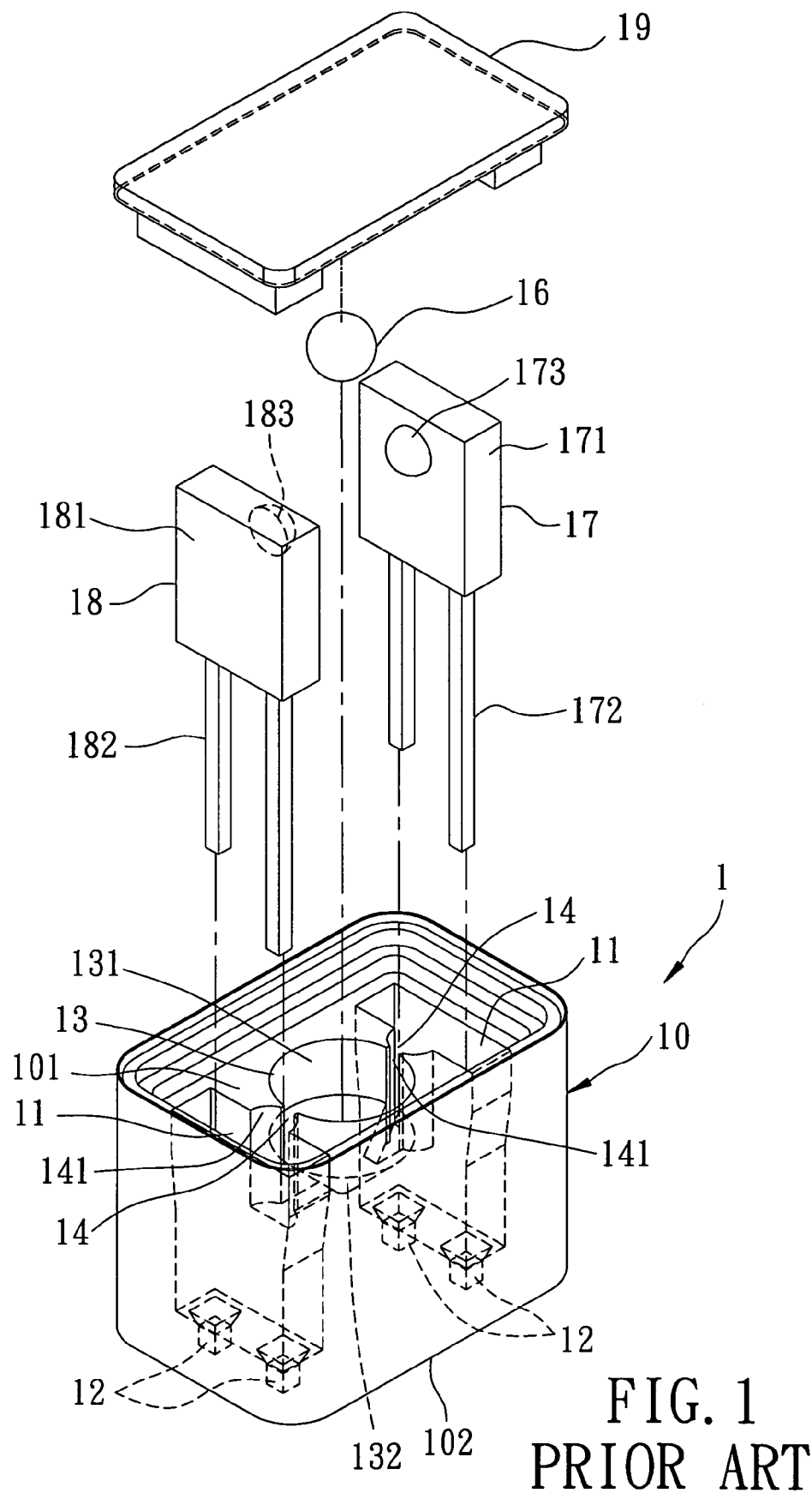
FIG. 1 is an exploded perspective view of a conventional tilt switch.
Figure 2:
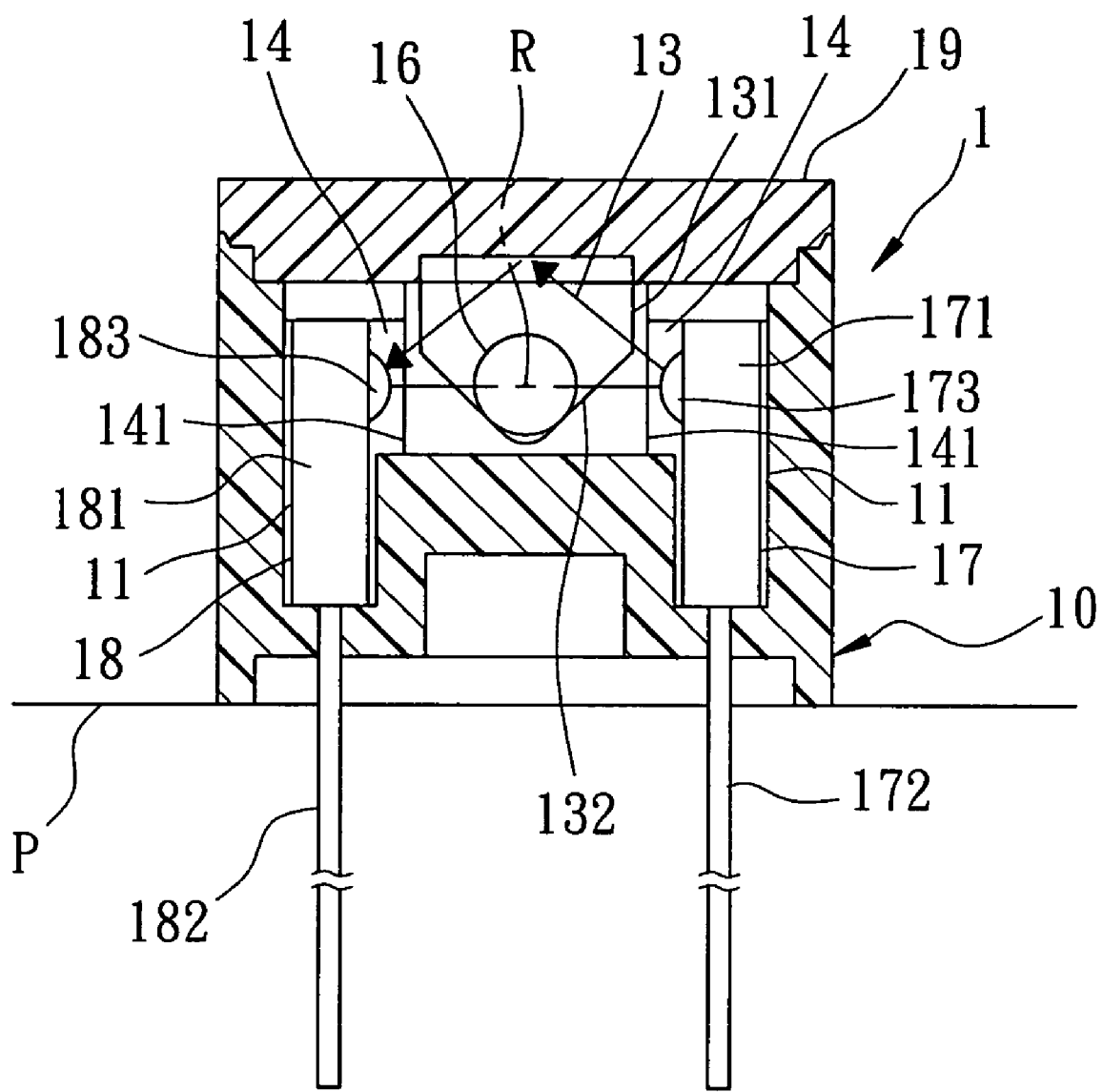
FIG. 2 is a sectional view of the conventional tilt switch in an assembled state.

Before the present invention is described in greater detail, it should be noted that like elements are denoted by the same reference numerals throughout the disclosure.

Referring to FIGS. 3 to 11, the first preferred embodiment of a tilt switch 100 according to the present invention is shown to comprise a base 2, an emitter 3, a receiver 4, a ball member 5, and a cover body 6.

The base 2 includes a base plate 21, an upright support 22 extending upwardly from the base plate 21 and having a top face 221, first and second side faces 23, 24 extending downwardly and respectively from two opposite ends of the top face 221 of the upright support 22, a lower groove 25 formed in the top face 221 of the upright support 22 between the first and second side faces 23, 24, and two opposite first and second lower passage holes 28, 29 formed in the top face 221 of the upright support 22 proximate to the first and second side faces 23, 24, respectively, and communicated with the lower groove 25.

The base plate 21 has two spaced-apart first through holes 212 formed proximate to the first side face 23, and two spaced-apart second through holes 213 formed proximate to the second side face 24.

The upright support 22 further has two opposite first and second lower slots 26, 27 formed in the top face 221 thereof and extending through the first and second side faces 23, 24, respectively. The first lower slot 26 communicates with the first lower passage hole 28. The second lower slot 27 communicates with the second lower passage hole 29.

The lower groove 25 has a tapered groove bottom 252 that is substantially V-shaped, and two opposite inclined surfaces 254, 255 that are inclined downwardly and respectively from the top face 221 of the upright support 22 to the groove bottom 252.

The emitter 3, in this embodiment, is an infrared light emitter, and has an emitter main body 31 seated on the base plate 21 proximate to the first side face 23, an emitter head 32, and two contact terminals 33 extending downwardly from the emitter main body 31 and out of the base plate 21 via the respective first through holes 212. The emitter head 32 projects from one side of the emitter main body 31 into the first lower slot 26, and has a central part aligned with the first lower passage hole 28 to emit a light signal.

The receiver 4 has a receiver main body 41 seated on the base plate 21 proximate to the second side face 24, a receiver head 42, and two contact terminals 43 extending downwardly from the receiver main body 41 and out of the base plate 21 via the respective second through holes 213. The receiver head 42 projects from one side of the receiver main body 41 into the second lower slot 27, and has a central part aligned with the second lower passage hole 29 to receive the light signal emitted by the emitter head 32.

The cover body 6 is made of a plastic material having a high insulating property, and includes a top wall 61, a surrounding wall 63 extending downwardly from a peripheral end of the top wall 61 toward the base plate 21 so as to surround the base plate 21, the upright support 22, and the emitter and receiver main bodies 31, 41 therein, two spaced-apart first and second press pieces 65, 66 projecting downwardly from an inner wall face 611 of the top wall 61 to press against the top face 221 of the upright support 22 proximate to the first and second side faces 23, 24, respectively, an upper groove 69 formed between the first and second press pieces 65, 66 and cooperating with the lower groove 25 to define a chamber 62, and a projection 64 projecting downwardly from the inner wall face 611 of the top wall 61 between the first and second press pieces 65, 66.

The first press piece 65 has a first upper passage hole 651 aligned and complementing with the first lower passage hole 28 to define a first light passage 321 for passage of the light signal. The second press piece 66 has a second upper passage hole 661 aligned and complementing with the second lower passage hole 29 to define a second light passage 421 for passage of the light signal. The light signal propagates along a light path (R) that passes through the chamber 62 from the first light passage 321 to the second light passage 421. Each of the first and second light passages 321, 421 has a size, especially a width in a top-to-bottom direction, smaller than a diameter of the ball member 5. Also, the size of each of the first and second light passages 321, 421 is smaller than that of the corresponding one of the emitter and receiver heads 32, 42.

The first press piece 65 further has a first upper slot 67 complementing with the first lower slot 26 to receive snugly the emitter head 32. The second press piece 66 further has a second upper slot 68 complementing with the second lower slot 27 to receive snugly the receiver head 42.

The tapered groove bottom 252 of the lower groove 25 extends along the light path (R). The projection 64 has a bottom end 641 extending above and along the light path (R). Preferably, the projection 64 has two opposite inclined surfaces 642 extending inclinedly from the bottom end 641 to the inner wall face 611 of the top wall 61.

The ball member 5 is rollable within the chamber 62, and may be made of a copper or iron alloy, or may be gold plated. In this embodiment, the ball member 5 is made of a copper alloy, and is plated with gold.

Each of the inclined surfaces 254, 255 of the lower groove 25, in this embodiment, has a length from the groove bottom 252 to the top face 221 of the upright support 22 longer than a diameter of the ball member 5. The diameter of the ball member 5, in turn, is larger than the distance between the groove bottom 252 and the light path (R).

After the cover body 6 covers the base 2, the emitter 3, and the receiver 4, adhesive 7 is applied between the surrounding wall 63 of the cover body 6 and the base plate 21 of the base 2, between the first through holes 212 and the corresponding contact terminals 33, and between the second through holes 213 and the corresponding contact terminals 43, thereby completing assembly of the tilt switch 100 of the present invention.

Figure 5:
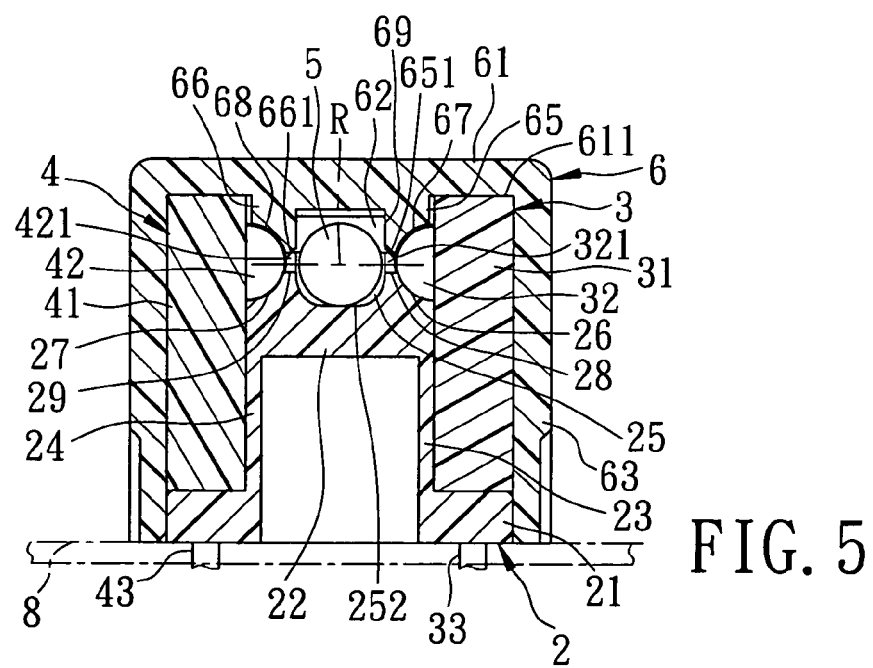
FIG. 5 is a sectional view of the first preferred embodiment taken along line V-V of FIG. 4.
Figure 6:
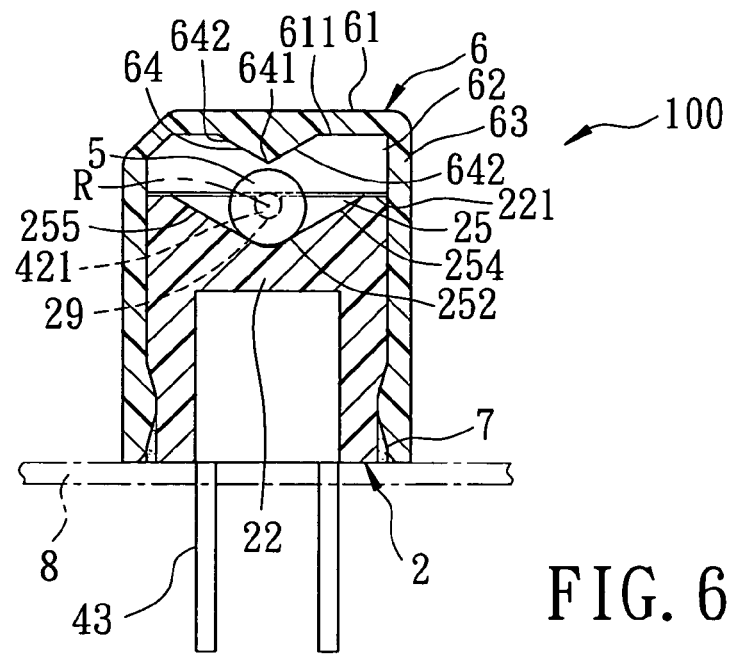
FIG. 6 is a sectional view of the first preferred embodiment taken along line VI-VI of FIG. 4.
Figure 7:
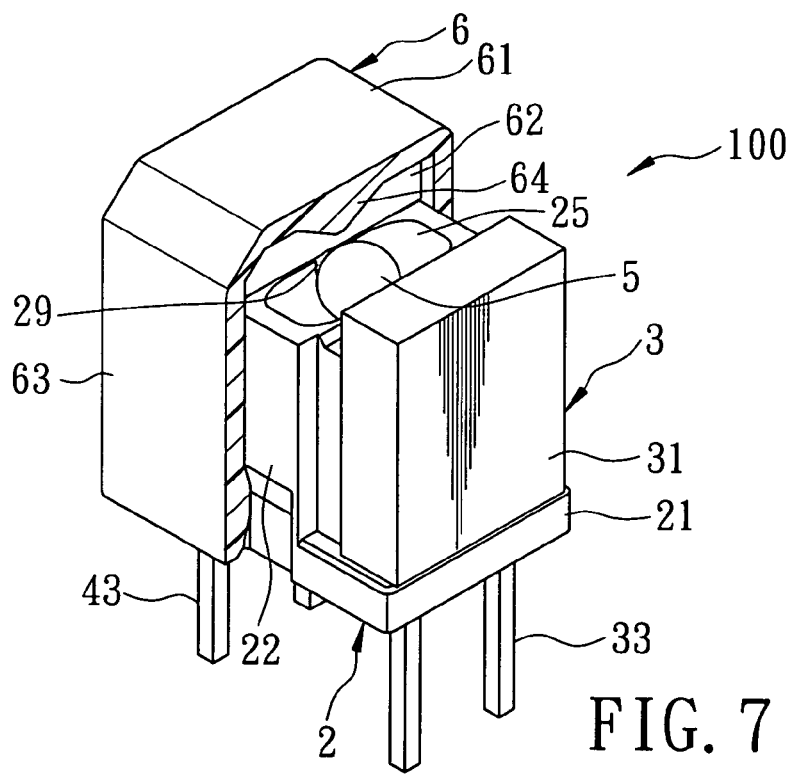
FIG. 7 is a view similar to FIG. 4, but with a portion of the tilt switch removed for the sake of clarity.

With reference to FIGS. 5, 6, and 7, with the tilt switch 100 mounted upright on a circuit board 8 and in an untilted state, the ball member 5 falls down to the tapered groove bottom 252 of the lower groove 25 by virtue of gravity, and blocks the light path (R). As such, the receiver head 42 cannot receive the light signal emitted from the emitter head 32. This places the tilt switch 100 in an "OFF" state.

Figure 3:
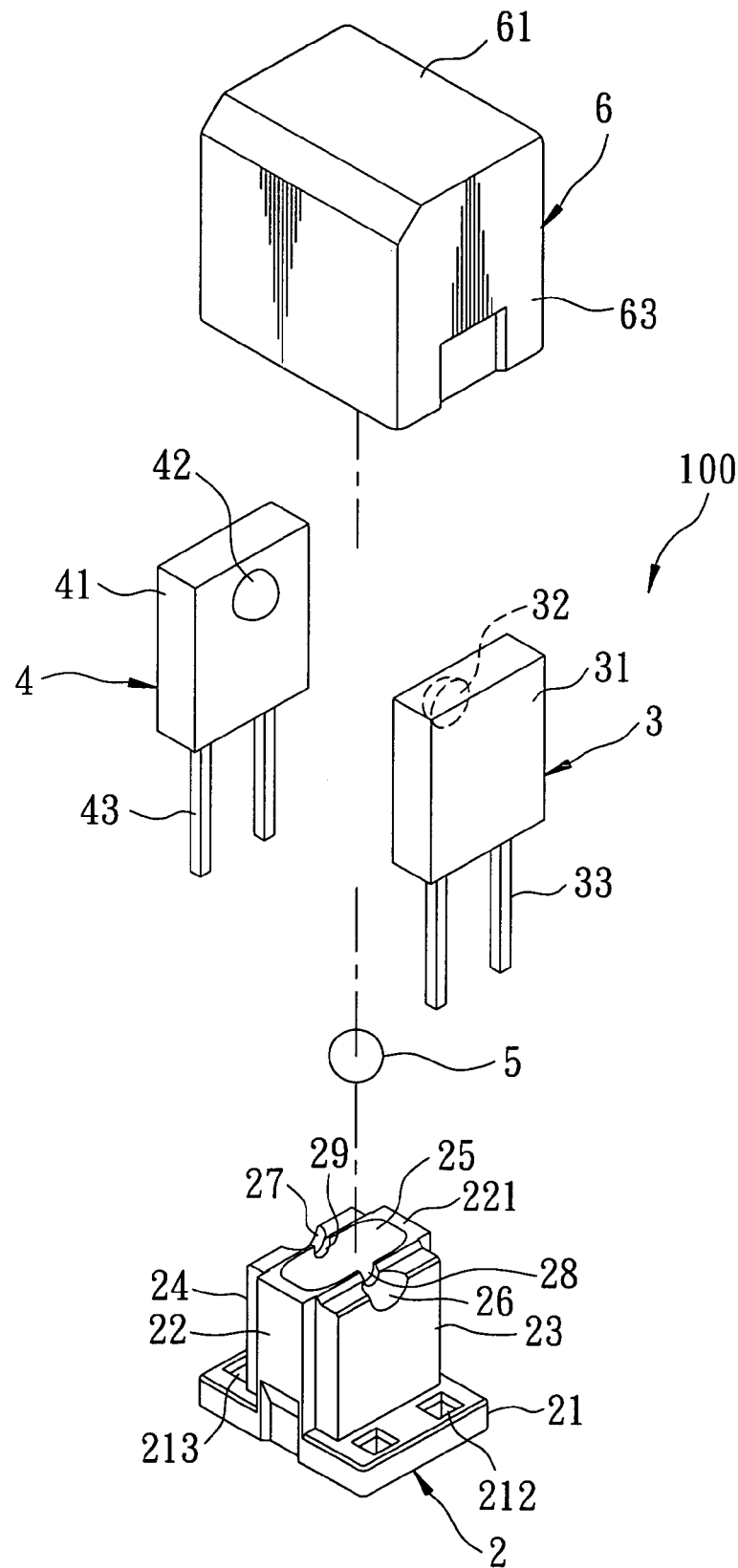
FIG. 3 is an exploded perspective view of the first preferred embodiment of a tilt switch according to the present invention.
Figure 4:
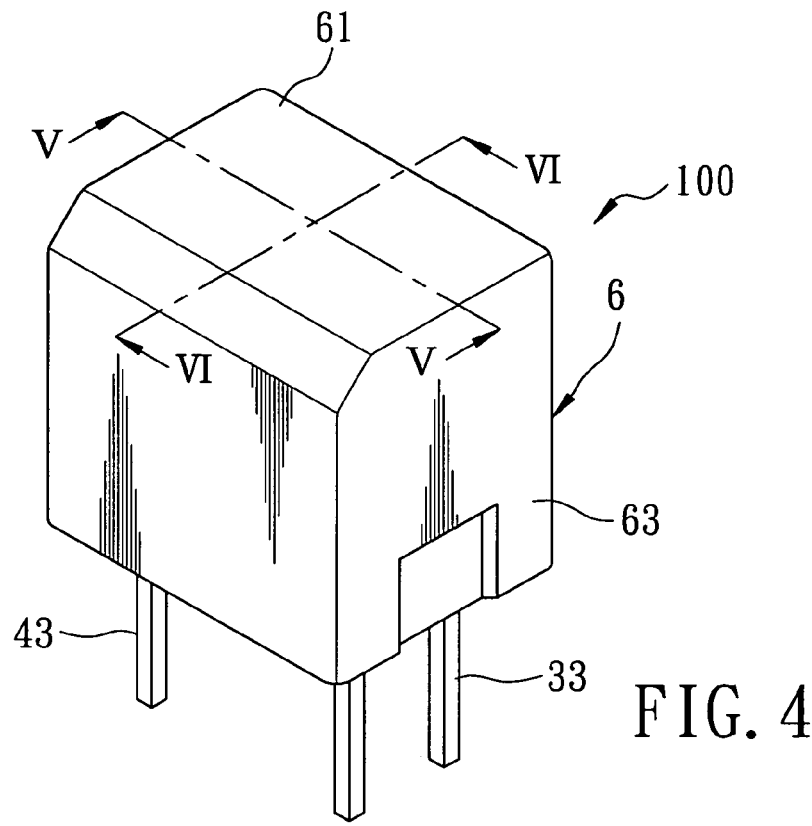
FIG. 4 is a perspective view of the first preferred embodiment in an assembled state.
Figure 8:
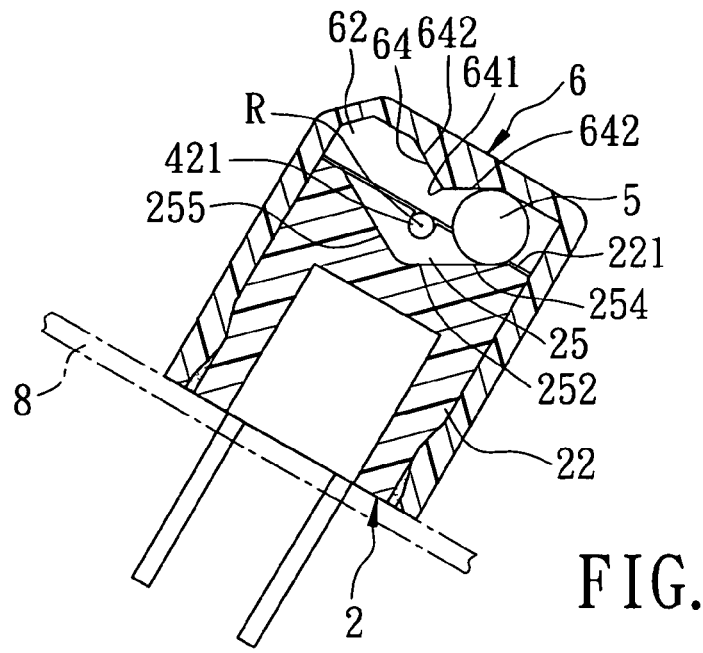
FIG. 8 is a view similar to FIG. 6, but illustrating the tilt switch in a tilted position with a ball member rolled out of a light path along a first inclined surface.
Figure 9:
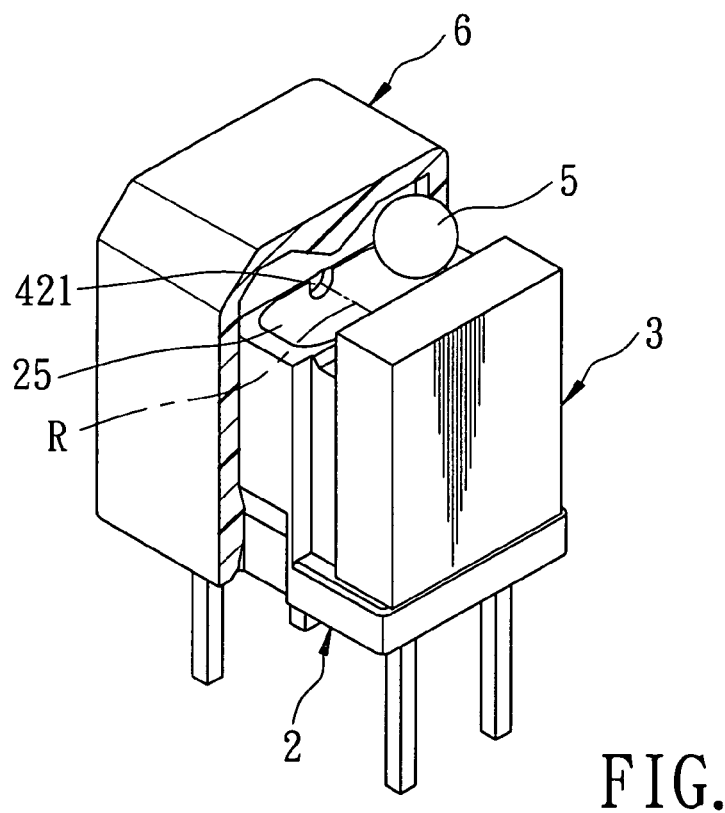
FIG. 9 is a view similar to FIG. 7, but with the ball member rolled out of the light path along the first inclined surface.

With reference to FIGS. 3, 8, and 9, when the tilt switch 100 together with the circuit board 8 is tilted to one side so as to roll the ball member 5 out of the groove bottom 252 toward the top face 221 of the upright support 22 along the first inclined surface 254, the light path (R) at this time is unblocked, so that the light signal emitted by the emitter head 32 can pass consecutively through the first light passage 321 (see FIG. 5), the chamber 62, and the second light passage 421 (see FIG. 5) so as to be received by the receiver head 42, thereby restoring communication between the emitter 3 and the receiver 4. This results in transition of the tilt switch 100 to an "ON" state.

Figure 10:
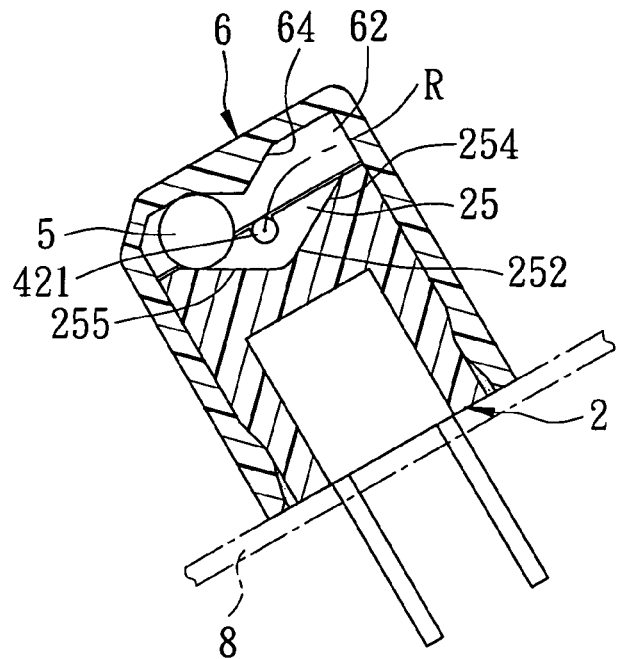
FIG. 10 is a view similar to FIG. 6, but illustrating the tilt switch in another tilted position with the ball member rolled out of the light path along a second inclined surface.
Figure 11:
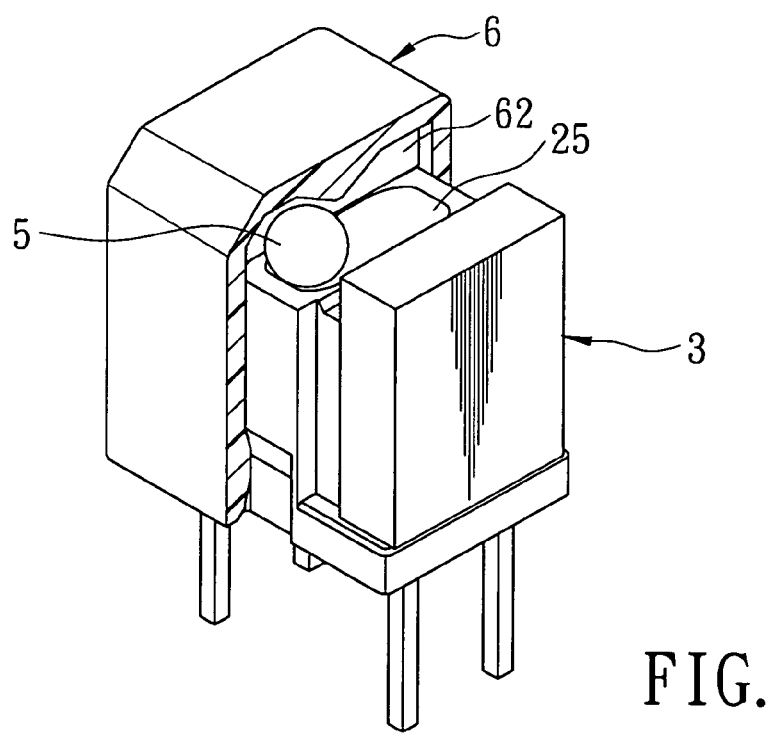
FIG. 11 is a view similar to FIG. 7, but with the ball member rolled out of the light path along the second inclined surface.
Figure 12:
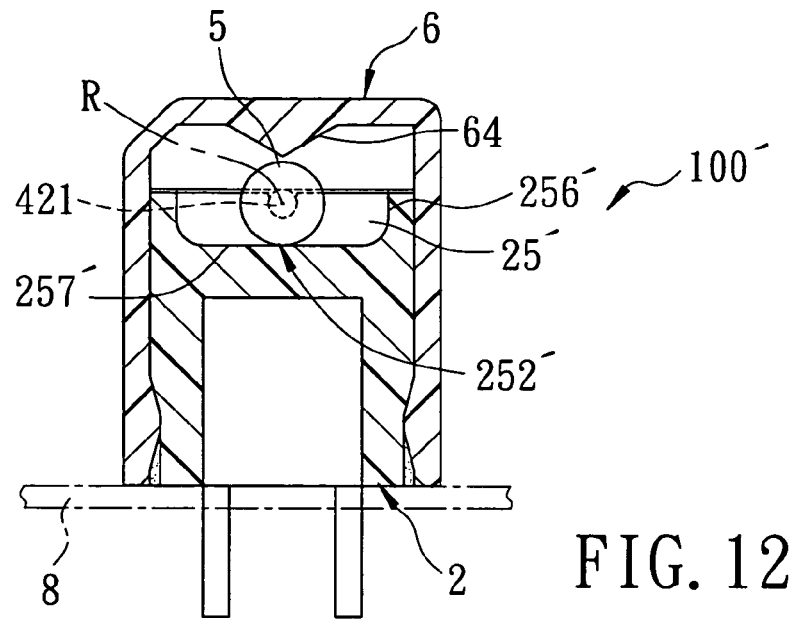
FIG. 12 is an assembled sectional view of the second preferred embodiment of a tilt switch according to the present invention.
Figure 13:
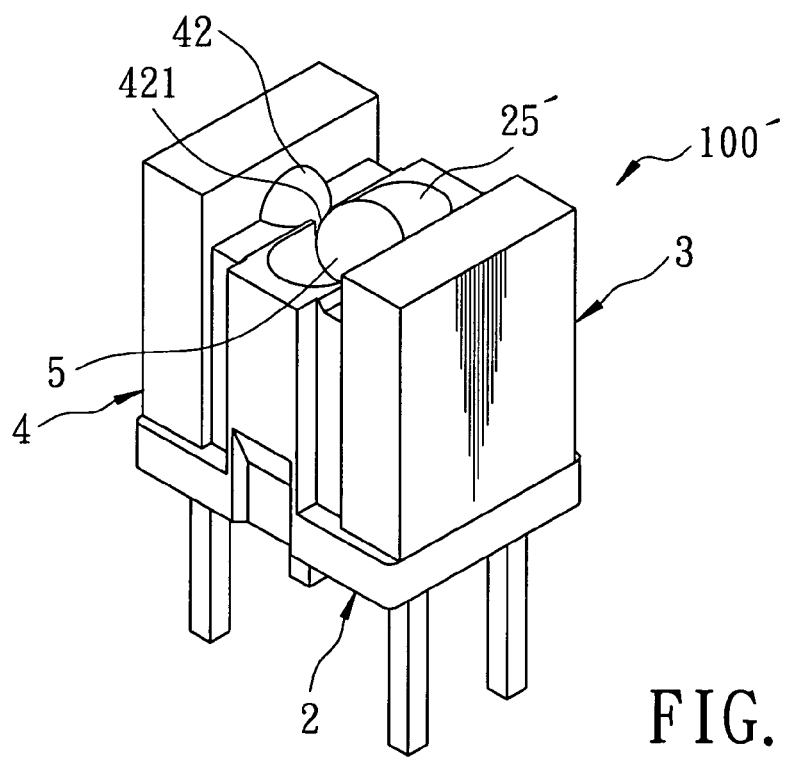
FIG. 13 is a perspective view of the second preferred embodiment with a portion of the tilt switch removed for the sake of clarity.

With reference to FIGS. 3, 10, and 11, when the tilt switch 100 together with the circuit board 8 is tilted to another side so as to roll the ball member 5 out of the groove bottom 252 to the top face 221 of the upright support 22 along the second inclined surface 255, the light path (R) at this time is similarly unblocked, so that communication between the emitter 3 and the receiver 4 is restored, and the tilt switch 100 is switched to the "ON" state.

Referring to FIGS. 12 to 17, a tilt switch 100' according to the second preferred embodiment of the present invention is shown to be similar to the first preferred embodiment. However, in this embodiment, the lower groove 25' has a substantially flat groove bottom 252', and two opposite lateral surfaces 256', 257' that extend respectively from two opposite ends of the groove bottom 252' to the top face 221 of the upright support 22. The lateral surfaces 256', 257' are substantially parallel to the light path (R). Each lateral surface 256', 257' has a distance from the light path (R) larger than the diameter of the ball member 5.

Figure 14:
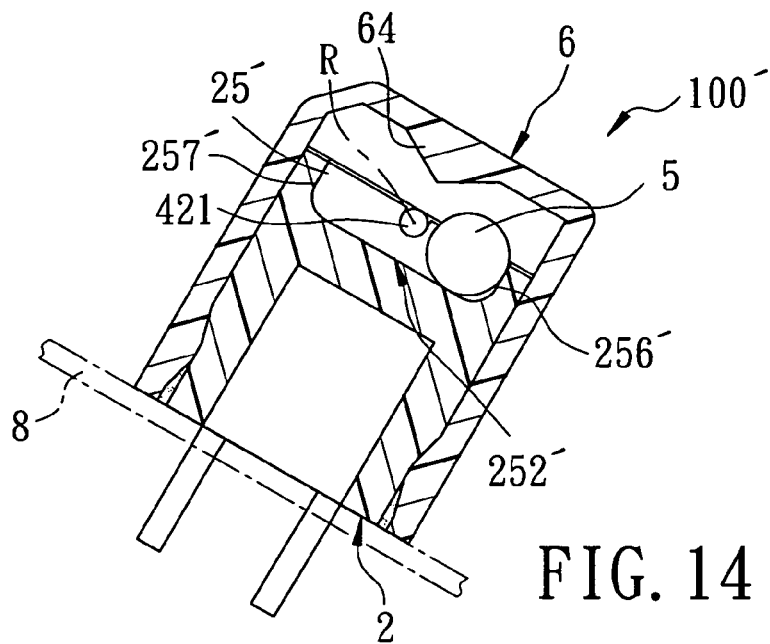
FIG. 14 is a view similar to FIG. 12, but with a ball member rolling toward the first inclined surface.
Figure 15:
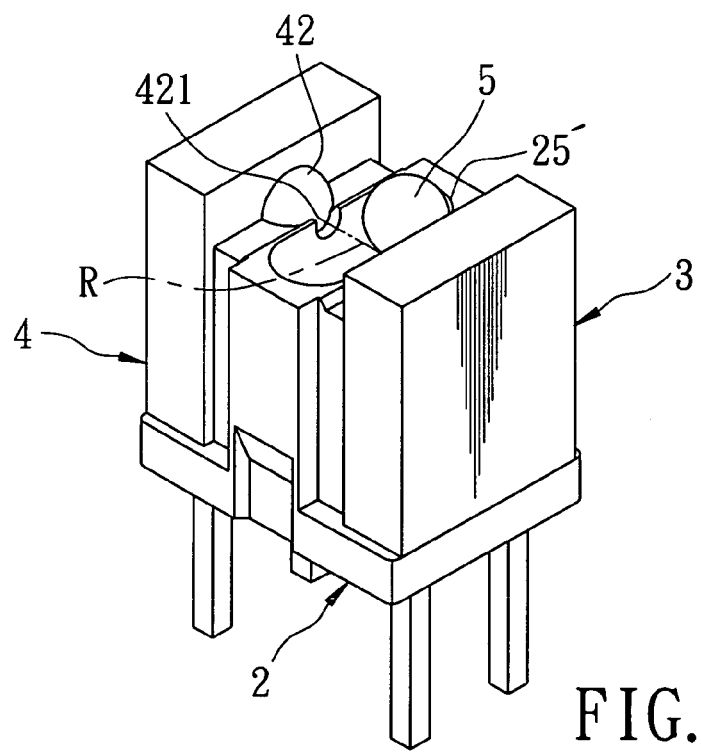
FIG. 15 is a view similar to FIG. 13, but with the ball member abutting against the first inclined surface.
Figure 16:
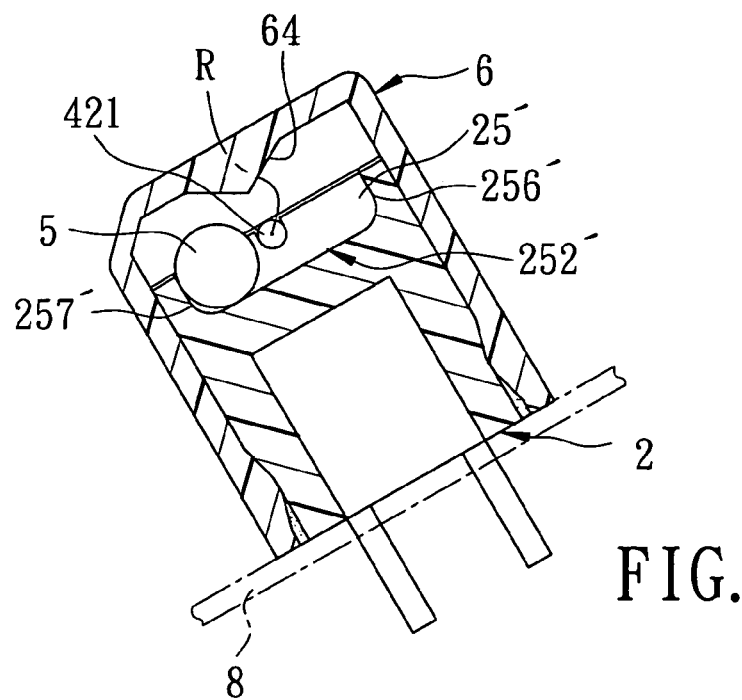
FIG. 16 is a view similar to FIG. 12, but with the ball member rolling toward the second inclined surface.
Figure 17:
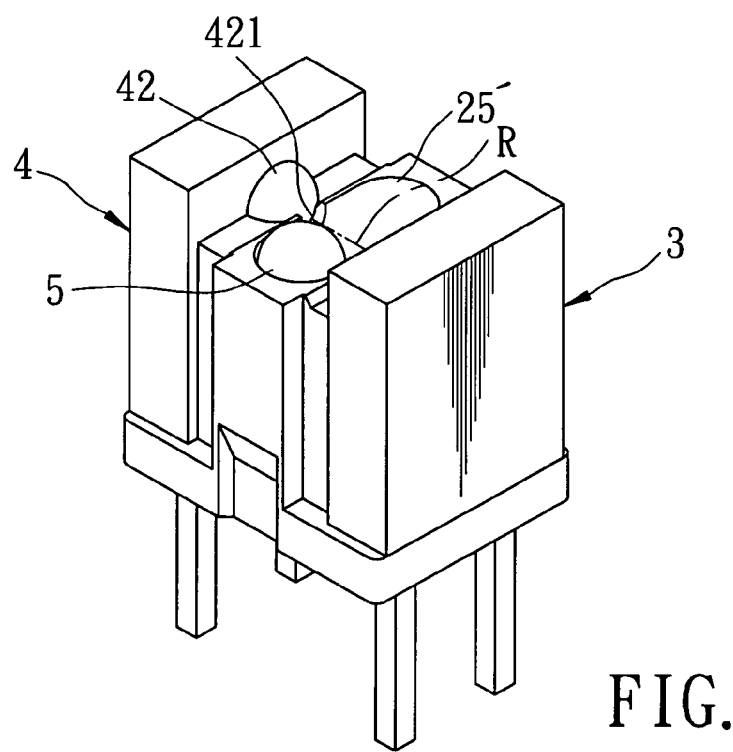
FIG. 17 is a view similar to FIG. 13, but with the ball member abutting against the second inclined surface.
Figure 18:
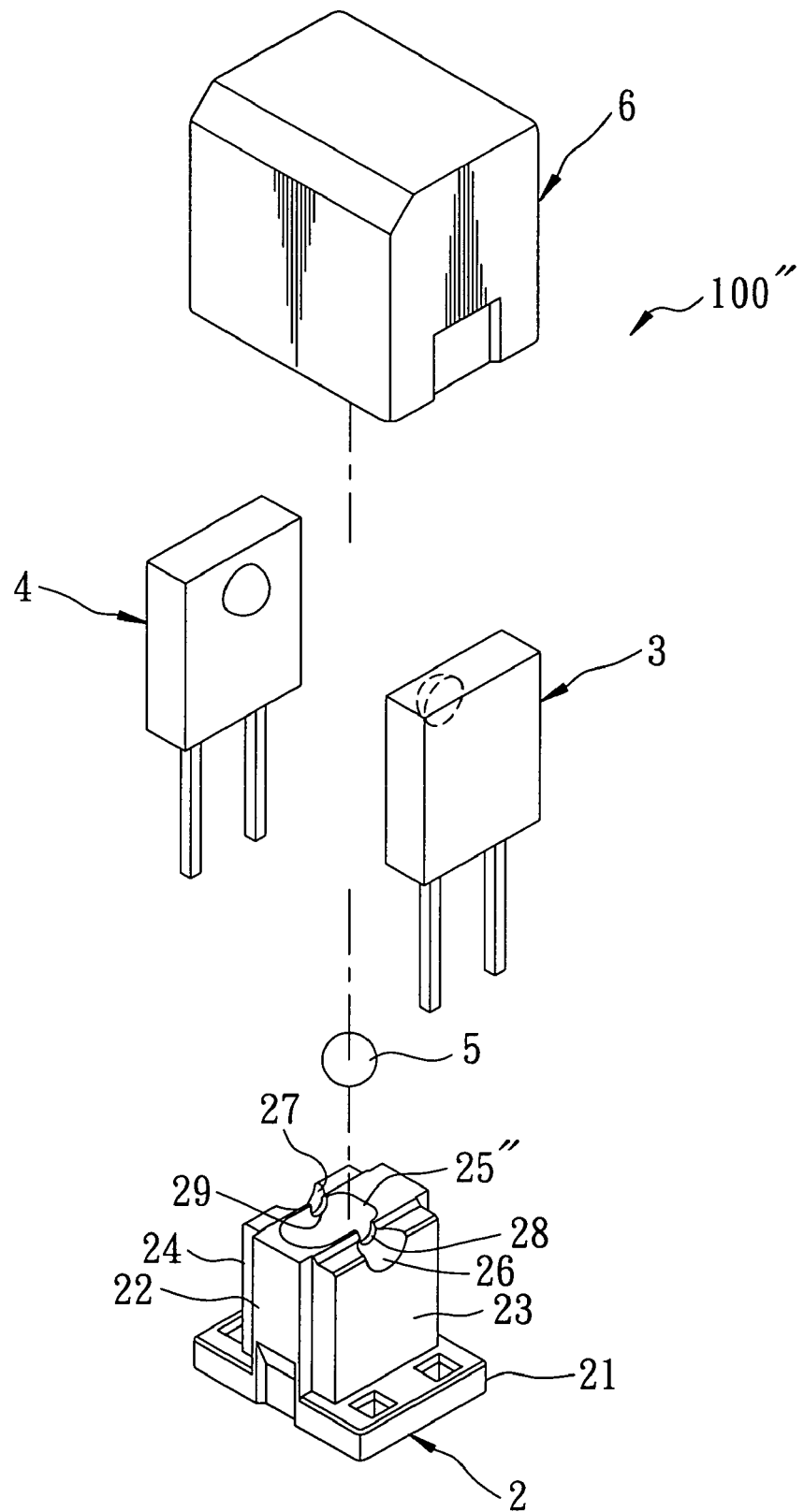
FIG. 18 is an exploded perspective view of the third preferred embodiment of a tilt switch according to the present invention.

When the tilt switch 100' is vibrated to move the ball member 5 to and fro between the lateral surfaces 256', 257', the ball member 5 passes through the light path (R) so that the light path (R) is blocked, and the tilt switch 100' is disposed in an "OFF" state. With reference to FIGS. 14 and 15, when the ball member 5 reaches the lateral surface 256', the light path (R) is unblocked, and the tilt switch 100' is in an "ON" state. With reference to FIGS. 16 and 17, when the ball member 5 reaches the lateral surface 257', the light path (R) is similarly unblocked, and the tilt switch 100' is in the "ON" state.

Referring to FIGS. 18 to 22, a tilt switch 100" according to the third preferred embodiment of the present invention is shown to be similar to the second preferred embodiment. However, in this embodiment, the lateral surface 256" has a distance from the light path (R) smaller than the diameter of the ball member 5, while the lateral surface 257" has a distance from the light path (R) longer than the diameter of the ball member 5.

Figure 19:
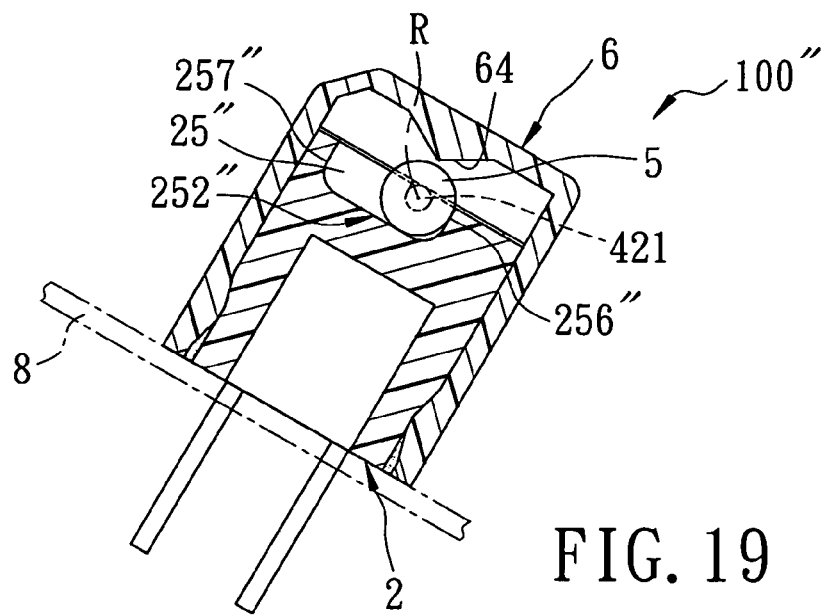
FIG. 19 is an assembled sectional view of the third preferred embodiment, illustrating a ball member abutting against a first inclined surface.
Figure 20:
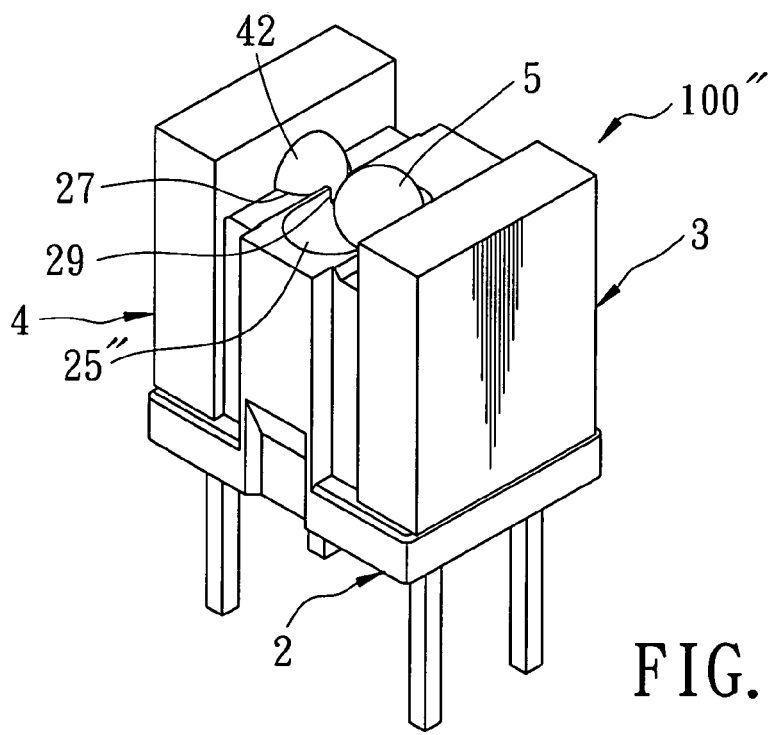
FIG. 20 is a perspective view of the third preferred embodiment with a portion of the tilt switch removed for the sake of clarity.
Figure 21:
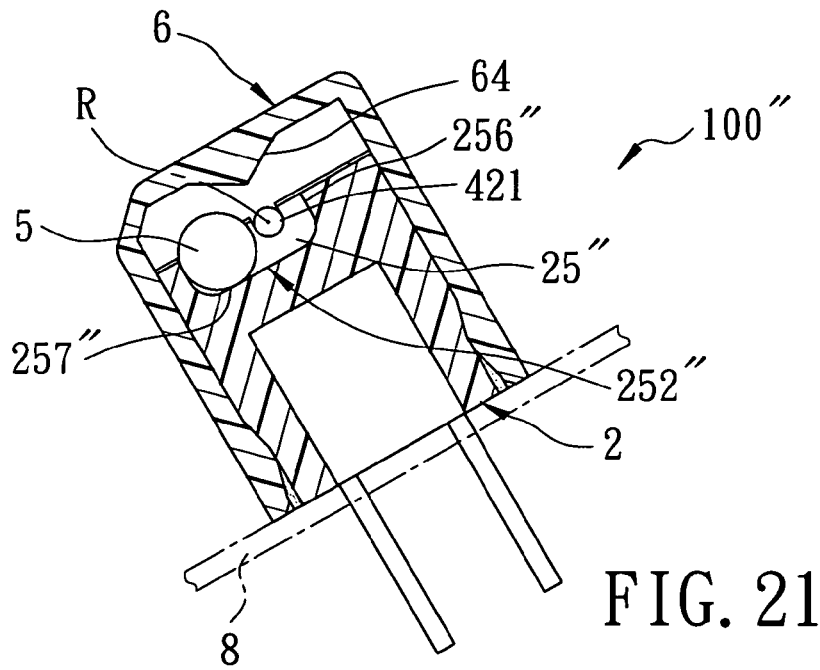
FIG. 21 is a view similar to FIG. 19, but with the ball member abutting against a second inclined surface.
Figure 22:
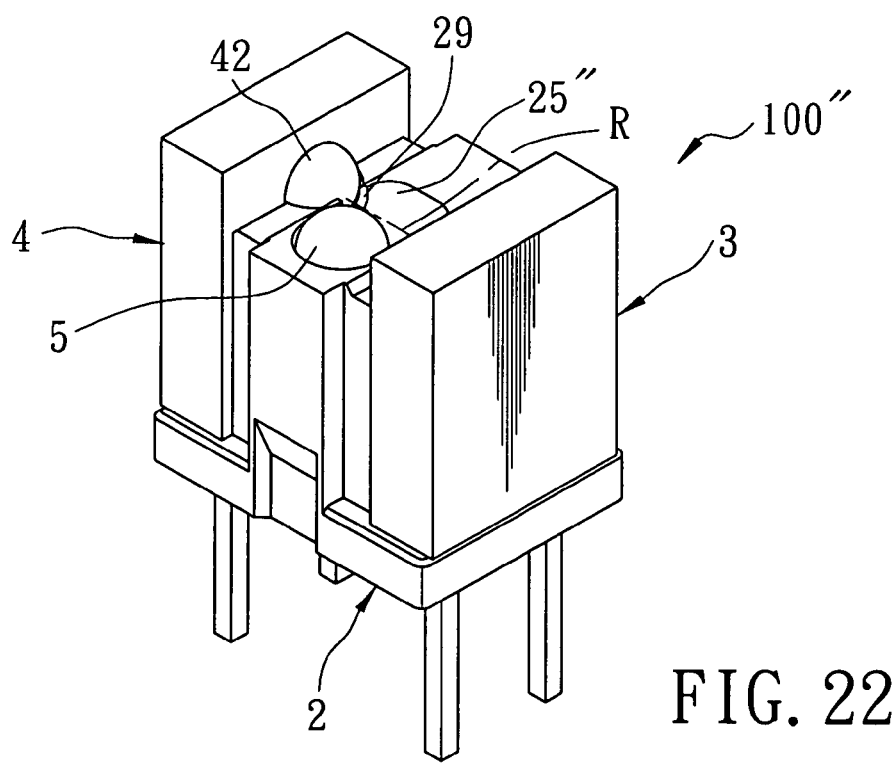
FIG. 22 is a view similar to FIG. 20, but with the ball member abutting against the second inclined surface.
Figure 23:
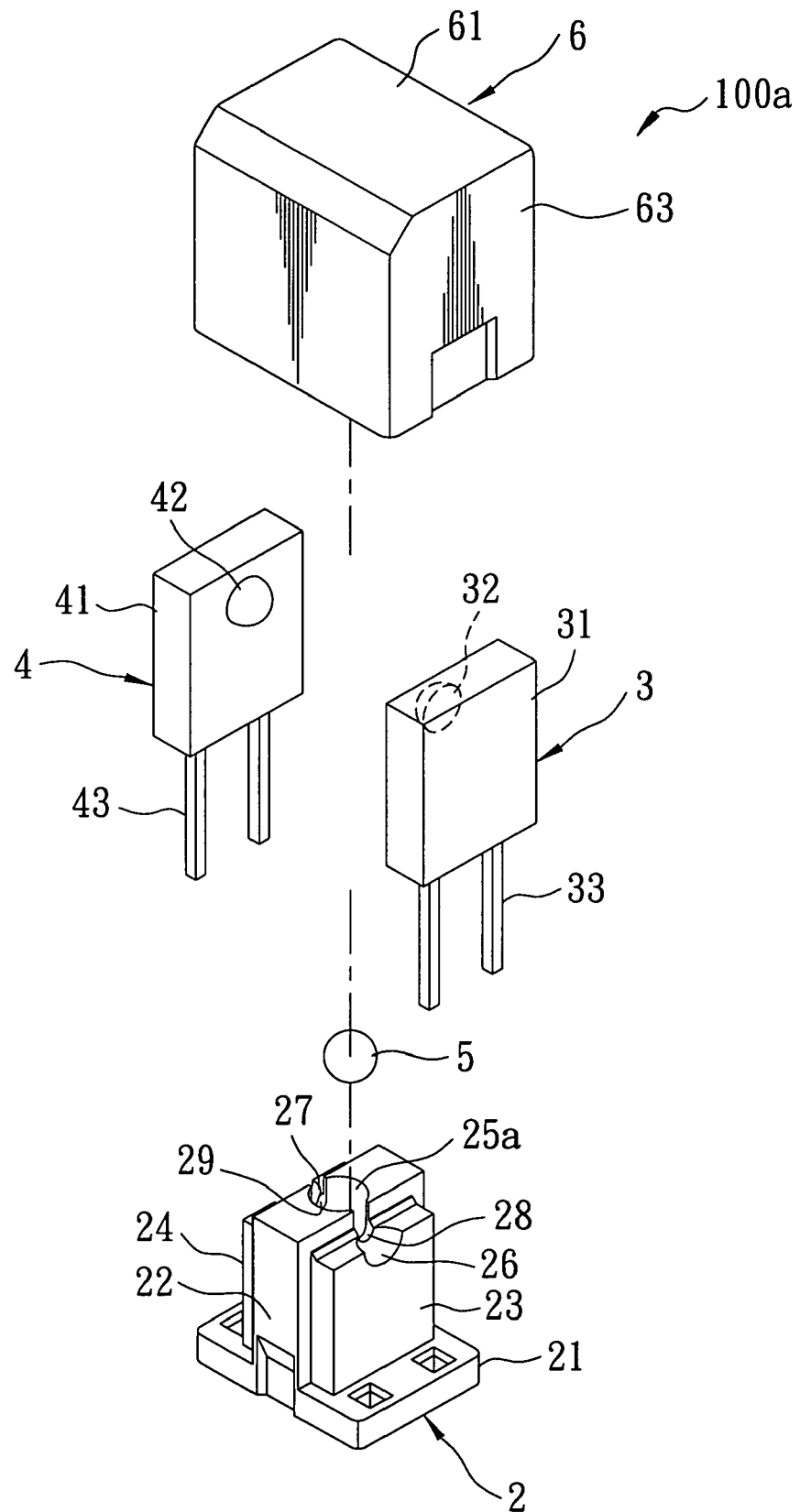
FIG. 23 is an exploded perspective view of the fourth preferred embodiment of a tilt switch according to the present invention.

With reference to FIGS. 19 and 20, when the ball member 5 rolls on the groove bottom 252" and abuts against the lateral surface 256", the light path (R) is blocked, and the tilt switch 100" is in an "OFF" state. With reference to FIGS. 21 and 22, when the tilt switch 100" is tilted to one side so as to roll the ball member 5 toward the lateral surface 257", the light path (R) is unblocked so as to dispose the tilt switch 100" in an "ON" state.

Referring to FIGS. 23 to 29, a tilt switch (100a) according to the fourth preferred embodiment of the present invention is shown to be similar to the first preferred embodiment. However, in this embodiment, the lower groove (25a) has a flat groove bottom (252a), and two opposite lateral surfaces (256a, 257a) extending upwardly and respectively from two opposite ends of the groove bottom (252a). The lateral surfaces (256a, 257a) are substantially parallel to the light path (R). Each lateral surface (256a, 257a) has a distance from the light path (R) smaller than the diameter of the ball member 5. The groove bottom (252a) has a distance from the light path (R) longer than the diameter of the ball member 5.

Figure 24:
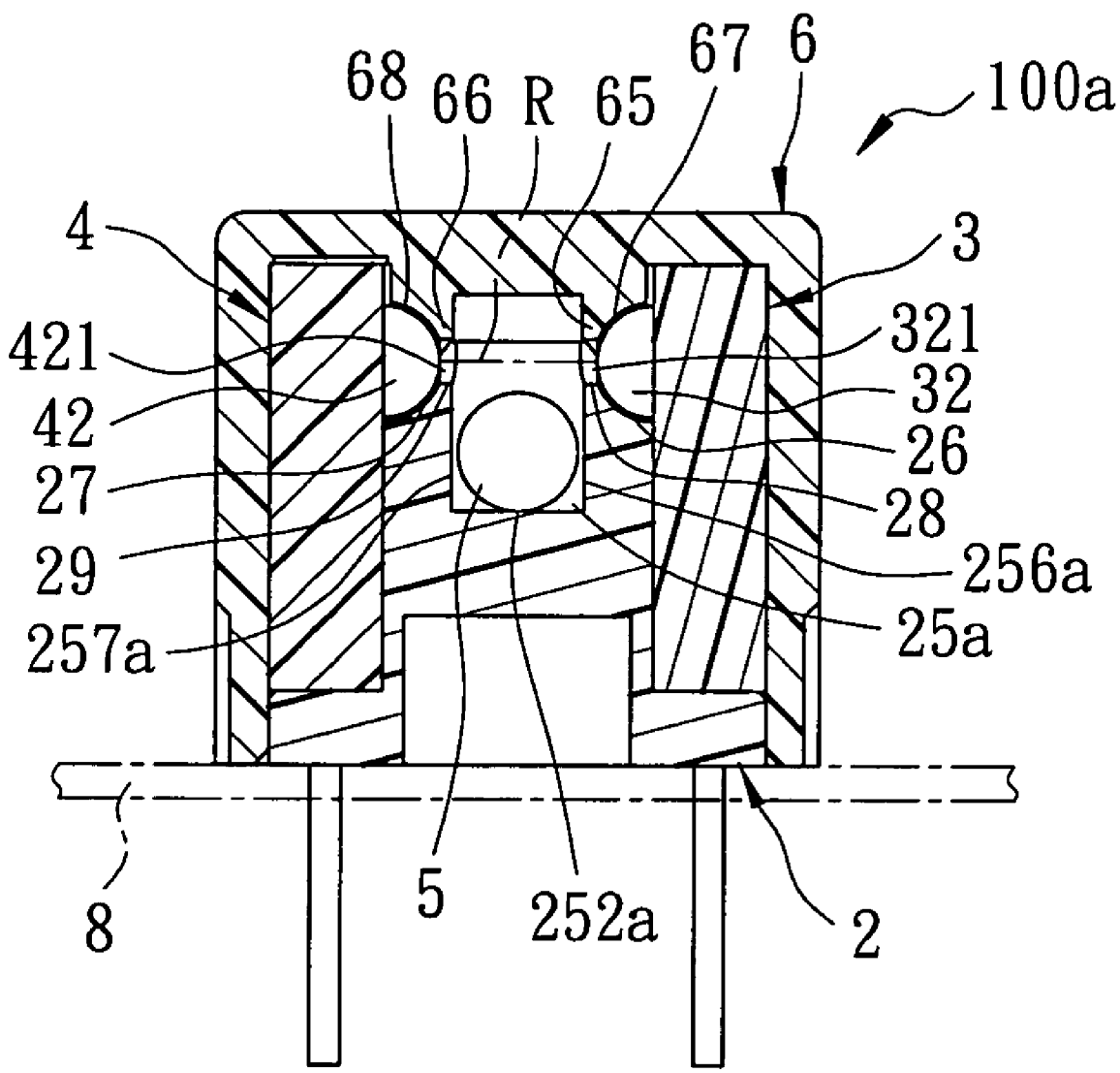
FIG. 24 is an assembled sectional view of the fourth preferred embodiment.
Figure 25:
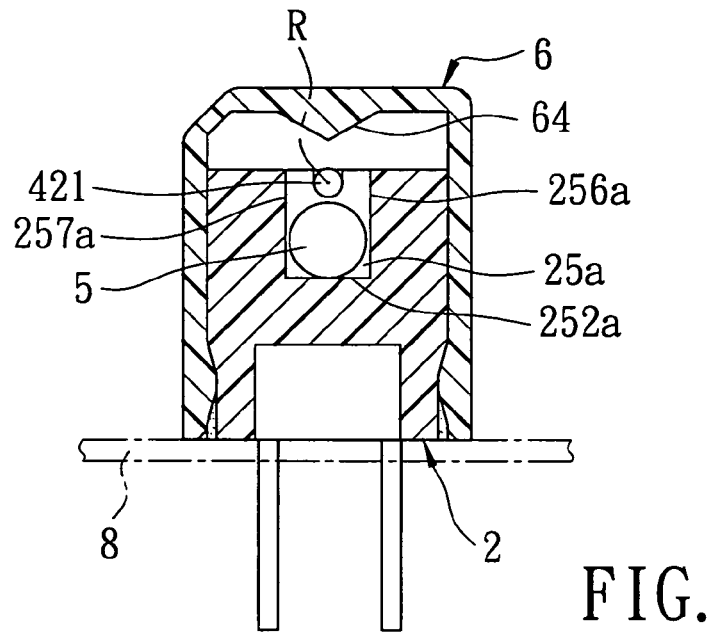
FIG. 25 is another assembled sectional view of the fourth preferred embodiment.
Figure 26:
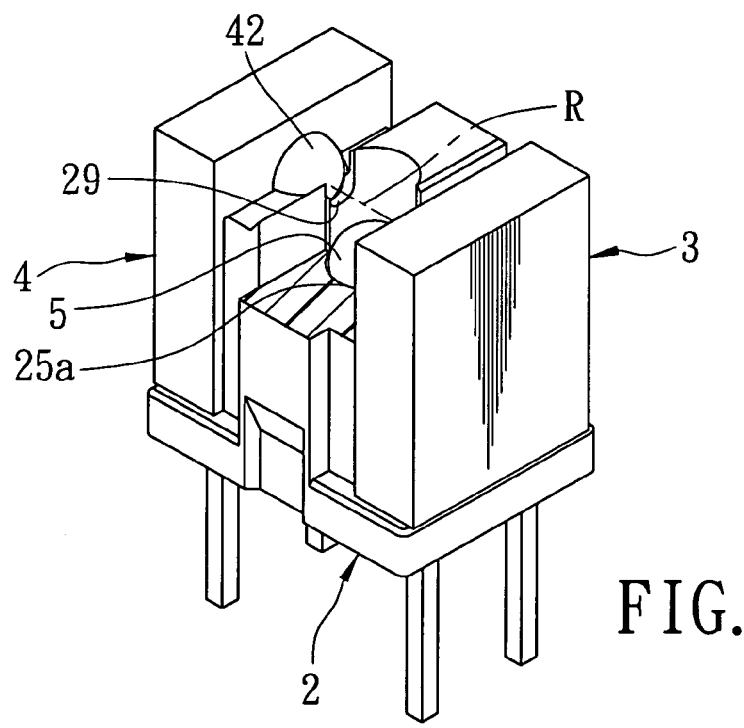
FIG. 26 is a perspective view of the fourth preferred embodiment with a portion of the tilt switch removed for the sake of clarity.
Figure 27:
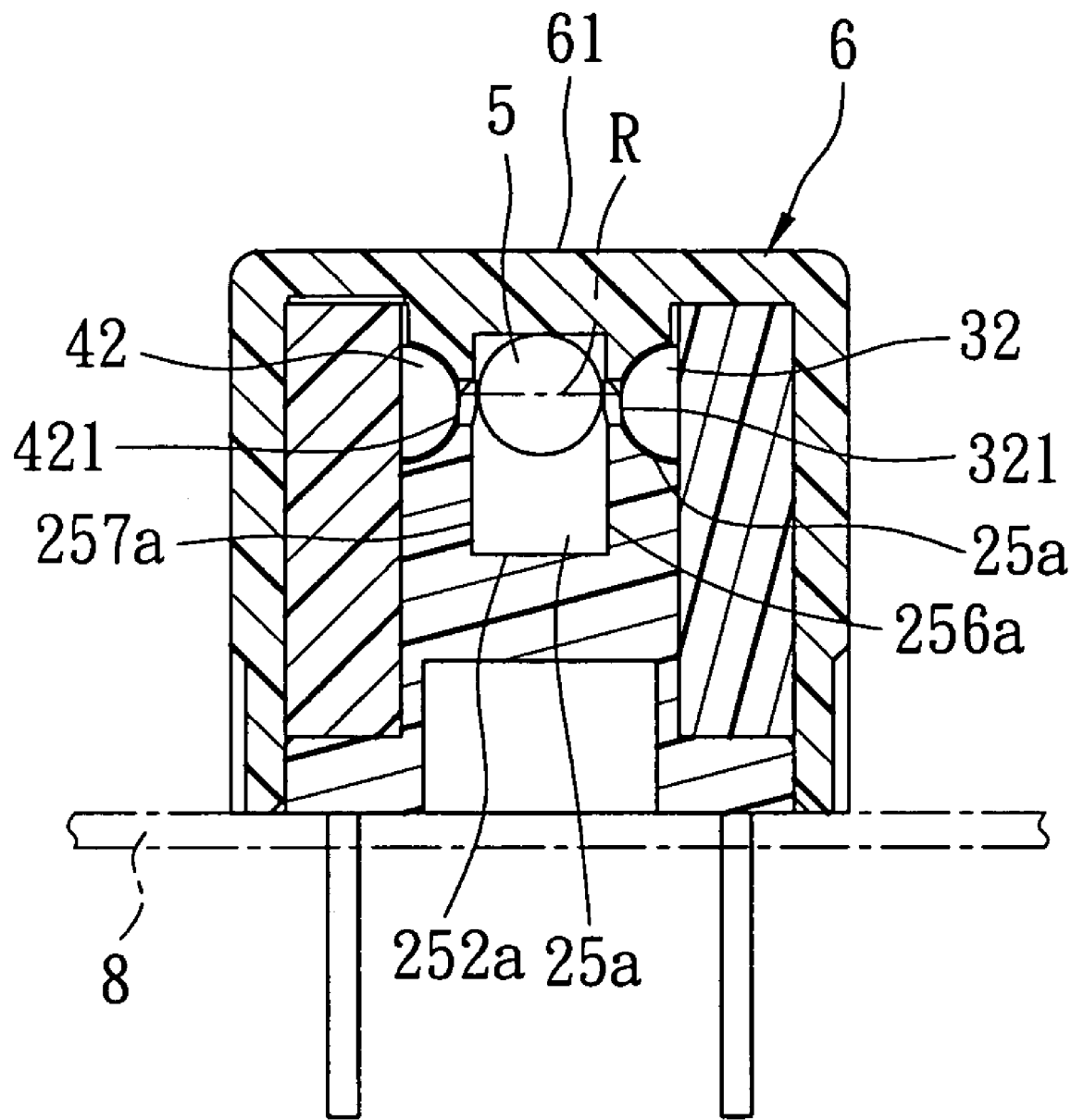
FIG. 27 is a view similar to FIG. 24, but with a ball member blocking a light path.
Figure 28:
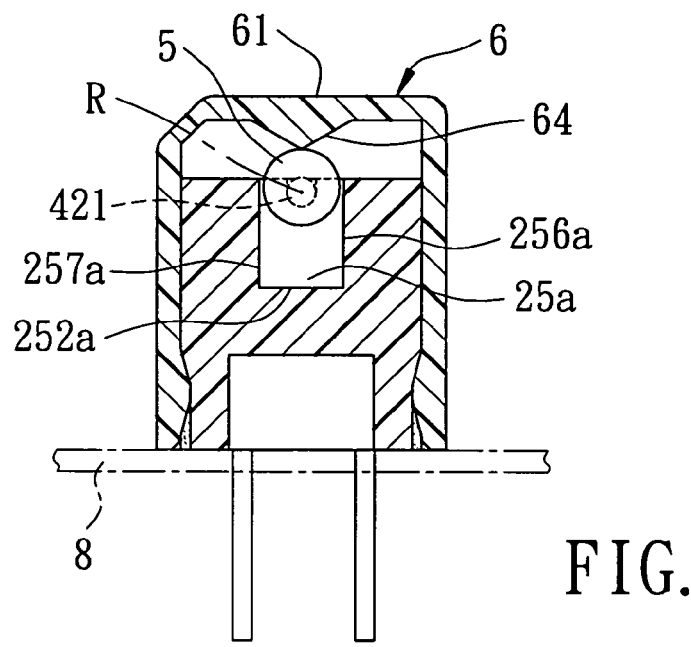
FIG. 28 is a view similar to FIG. 25, but with the ball member blocking the light path.
Figure 29:
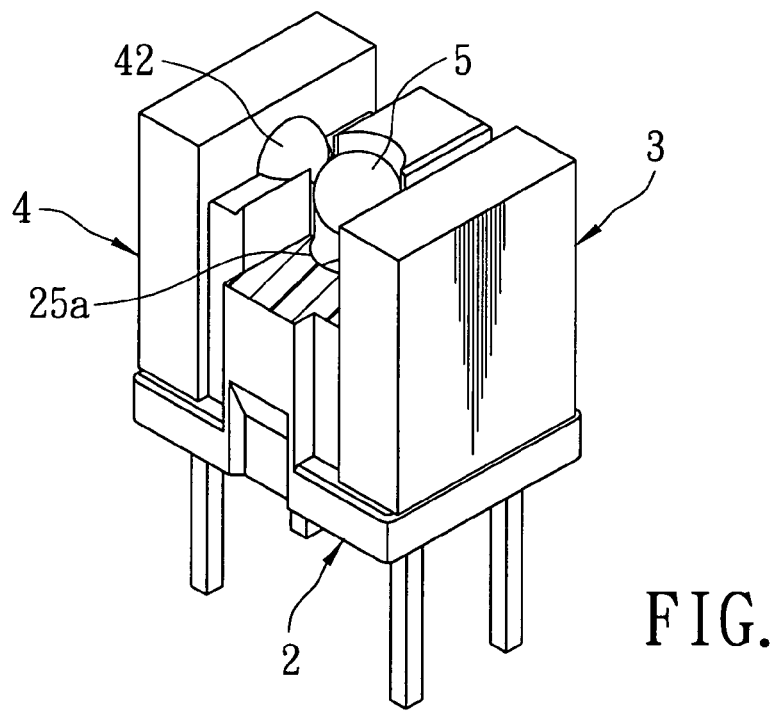
FIG. 29 is a view similar to FIG. 26, but with the ball member blocking a light path.

With reference to FIGS. 24, 25, and 26, when the ball member 5 is located in the groove bottom (252a), the light path (R) is unblocked, and the tilt switch (100a) is in an "ON" state. With reference to FIGS. 27, 28, and 29, when the tilt switch (100a) is vibrated so as to toss the ball member 5 toward the top wall 61 of the cover body 6, the light path (R) is blocked, and the tilt switch (100a) is in an "OFF" state.

It should be noted that surface mount technology may be employed in which the contact terminals 33, 43 of the emitter 3 and the receiver 4 of the tilt switch 100, 100', 100", (100a) of the present invention are bent to connect with the circuit board 8 through a surface mount process.

In the present invention, because the first lower and upper slots 26, 67 complement each other to confine the emitter head 32 therein, because the second lower and upper slots 27, 68 complement each other to confine the receiver head 42 therein, and because the light emitted by the emitter 3 is confined to pass through the first and second light passages 321, 421 that are small, scattering of the light can be alleviated. Further, because of the projection 64 on the top wall 61 of the cover body 6, undesirable reflection of the light toward the second light passage 421 can be minimized, so that the possibility of erroneous operation of the tilt switch 100, 100', 100", (100a) can be reduced.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A tilt switch comprising:
   a base including an upright support that has a top face, first and second side faces extending downwardly and respectively from two opposite ends of said top face, a lower groove formed in said top face between said first and second side faces, and two opposite first and second lower passage holes formed in said top face proximate to said first and second side faces, respectively, and communicated with said lower groove;
   an emitter including an emitter main body mounted on said base proximate to said first side face, and an emitter head aligned with said first lower passage hole to emit a light signal;
   a receiver to receive said light signal, and including a receiver main body mounted on said base proximate to said second side face, and a receiver head aligned with said second lower passage hole;
   a cover body including a top wall, two spaced-apart first and second press pieces projecting downwardly from said top wall to press against said top face of said upright support proximate to said first and second side faces, respectively, and an upper groove formed between said first and second press pieces and cooperating with said lower groove to define a chamber, said first press piece having a first upper passage hole aligned and complementing with said first lower passage hole to define a first light passage for passage of said light signal, said second press piece having a second upper passage hole aligned and complementing with said second lower passage hole to define a second light passage for passage of said light signal, said light signal propagating along a light path passing through said chamber from said first light passage to said second light passage;
   a ball member rollable within said chamber to block or unblock said light path,
   wherein each of said first and second light passages has a width in a top-to-bottom direction, said width being smaller than a diameter of said ball member.

2. The tilt switch of claim 1, wherein said upright support further has two opposite first and second lower slots formed in said top face and extending through said first and second side faces, respectively, said first lower slot being communicated with said first lower passage hole, said second lower slot being communicated with said second lower passage hole, said emitter head projecting from said emitter main body into said first lower slot, said receiver head projecting from said receiver main body into said second lower slot, said first press piece further having a first upper slot complementing with said first lower slot to receive snugly said emitter head, said second press piece further having a second upper slot complementing with said second lower slot to receive snugly said receiver head, each of said first and second light passages having a size smaller than that of each of said emitter and receiver heads.

3. The tilt switch of claim 1, wherein said cover body further includes a projection projecting downwardly from said top wall of said cover body between said first and second press pieces, and having a bottom end extending above and along said light path.

4. The tilt switch of claim 1, wherein said base further has a base plate, said upright support extending upwardly from said base plate, said cover body further having a surrounding wall surrounding said upright support and said emitter and receiver main bodies, and extending downwardly from said top wall of said cover body to said base plate.

5. The tilt switch of claim 1, wherein said lower groove has a tapered groove bottom that extends along said light path, and two opposite inclined surfaces that are inclined downwardly and respectively from said top face of said upright support to said groove bottom, each of said inclined surfaces having a length from said groove bottom to said top face longer than a diameter of said ball member.

6. The tilt switch of claim 1, wherein said lower groove has a substantially flat groove bottom, and two opposite lateral surfaces extending respectively from two opposite ends of said flat groove bottom to said top face of said upright support, said lateral surfaces being substantially parallel to said light path, and each having a distance from said light path larger than a diameter of said ball member.

7. The tilt switch of claim 1, wherein said lower groove has a substantially flat groove bottom, and two opposite lateral surfaces extending respectively from two opposite ends of said flat groove bottom to said top face of said upright support, said lateral surfaces being substantially parallel to said light path, one of said lateral surfaces having a distance from said light path longer than a diameter of said ball member, the other one of said lateral surfaces having a distance from said light path smaller than the diameter of said ball member.

8. The tilt switch of claim 1, wherein said lower groove has a substantially flat groove bottom, and two opposite lateral surfaces extending respectively from two opposite ends of said groove bottom to said top face of said upright support, said lateral surfaces being substantially parallel to said light path and each having a distance from said light path smaller than a diameter of said ball member, said groove bottom having a distance from said light path longer than the diameter of said ball member.

* * * * *